(12) United States Patent
Sangster

(10) Patent No.: US 6,457,919 B1
(45) Date of Patent: Oct. 1, 2002

(54) MULTI-PURPOSE MACHINE TOOL FOR HIGH VOLUME SECONDARY OPERATIONS

(76) Inventor: William D. Sangster, 38 Lords La., Deep River, CT (US) 06417

( * ) Notice: Subject to any disclaimer, the term of this patent is extended or adjusted under 35 U.S.C. 154(b) by 0 days.

(21) Appl. No.: 09/371,328

(22) Filed: Aug. 10, 1999

Related U.S. Application Data

(60) Provisional application No. 60/096,018, filed on Aug. 11, 1998.

(51) Int. Cl.[7] .............................. B23C 1/10; B23C 1/14; B23B 39/16
(52) U.S. Cl. ........................ 409/202; 409/203; 409/212; 409/192; 409/198; 408/97; 408/39; 408/44; 408/115 B
(58) Field of Search ................................ 409/202, 212, 409/192, 198, 203, 221, 165, 166; 408/39, 38, 37, 90, 89, 43, 44, 45, 72 B, 72 R, 97, 115 R, 115 B; 29/38 C, 26 A

(56) References Cited

U.S. PATENT DOCUMENTS

| | | | | |
|---|---|---|---|---|
| 2,271,848 A | * | 2/1942 | Tcimpidis | 409/221 |
| 2,393,696 A | * | 1/1946 | Kraut et al. | 409/212 |
| 2,415,269 A | * | 2/1947 | Yeomans et al. | 408/90 |
| 2,877,670 A | * | 3/1959 | Allen | 408/39 |
| 3,575,086 A | * | 4/1971 | Davis | 409/92 |
| 3,618,265 A | * | 11/1971 | Croop | 408/39 |
| 3,967,816 A | * | 7/1976 | Ransperger et al. | 269/9 |
| 4,162,065 A | * | 7/1979 | Rea | 269/294 |
| 4,218,161 A | * | 8/1980 | Zolkind | 408/115 B |
| 4,594,038 A | | 6/1986 | Mundelius et al. | |
| 4,729,192 A | | 3/1988 | Elsdoerfer | |
| 4,730,373 A | * | 3/1988 | Senoh | 408/39 |
| 4,771,521 A | | 9/1988 | Smith et al. | |
| 4,915,551 A | * | 4/1990 | Watson et al. | 408/72 R |
| 5,081,889 A | * | 1/1992 | Takano et al. | 82/122 |
| 5,105,693 A | | 4/1992 | Hagen | |
| 5,105,696 A | | 4/1992 | Baubles | |
| 5,314,397 A | * | 5/1994 | Mills et al. | 409/202 |
| 5,839,323 A | * | 11/1998 | Line | 409/202 |

* cited by examiner

Primary Examiner—A. L. Wellington
Assistant Examiner—Erica Ergenbright

(57) ABSTRACT

A multi-purpose machine tool is provides for high volume secondary operations. Multiple machining heads and eight degrees of freedom provide for maximum versatility and adaptability for convenient set-up.

15 Claims, 7 Drawing Sheets

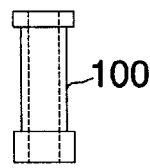
FIG. 4
 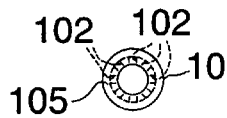 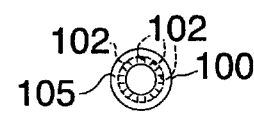 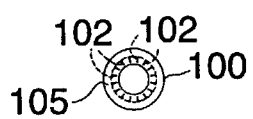
FIG. 4aa   FIG. 4bb   FIG. 4cc   FIG. 4dd
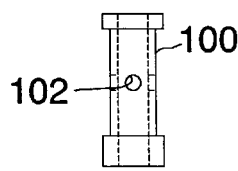 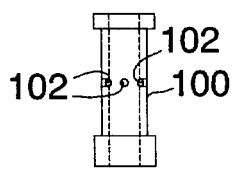 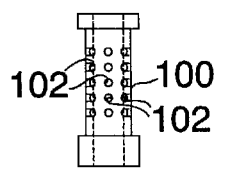 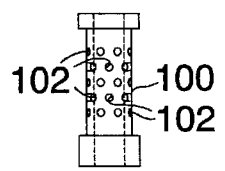
FIG. 4a   FIG. 4b   FIG. 4c   FIG. 4d
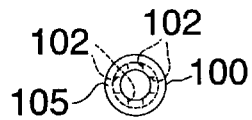 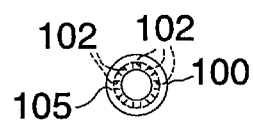 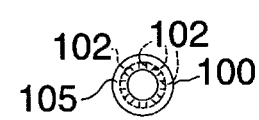 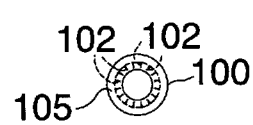
FIG. 4ee   FIG. 4ff   FIG. 4gg   FIG. 4hh
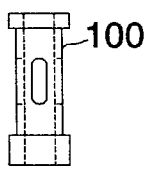 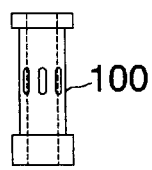 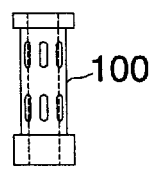 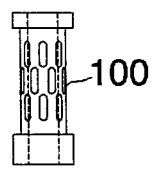
FIG. 4e   FIG. 4f   FIG. 4g   FIG. 4h
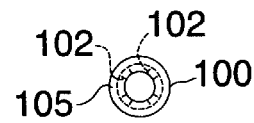 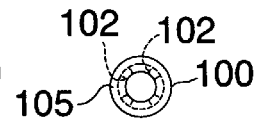 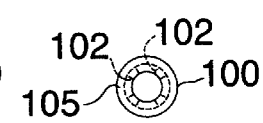 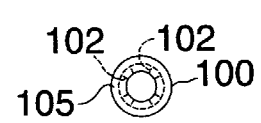
FIG. 4ii   FIG. 4jj   FIG. 4kk   FIG. 4ll
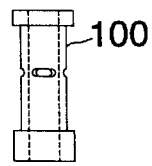 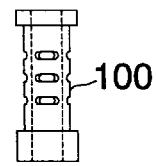 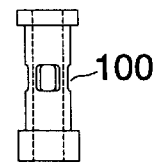 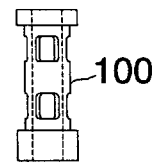
FIG. 4i   FIG. 4j   FIG. 4k   FIG. 4l

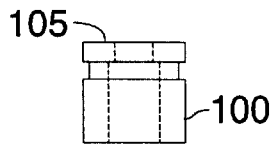
FIG. 5
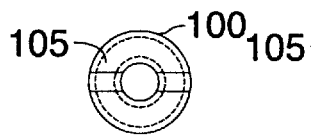 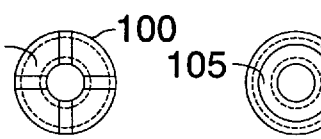 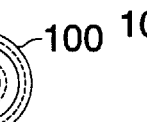 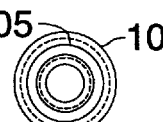
FIG. 5aa   FIG. 5bb   FIG. 5cc   FIG. 5dd
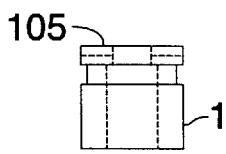 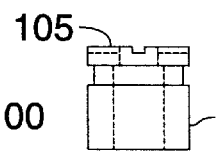 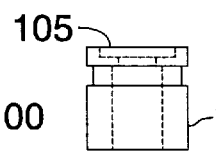 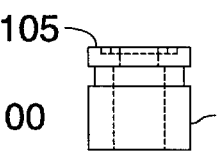
FIG. 5a   FIG. 5b   FIG. 5c   FIG. 5d
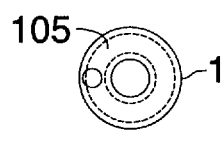 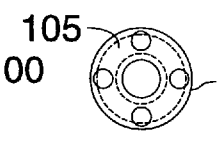 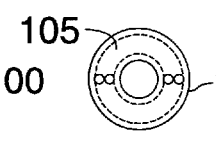 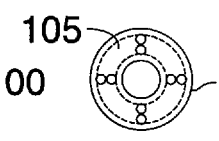
FIG. 5ee   FIG. 5ff   FIG. 5gg   FIG. 5hh
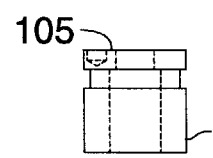 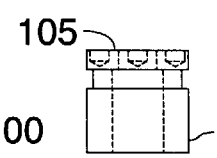 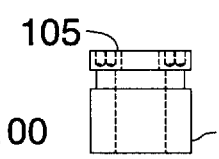 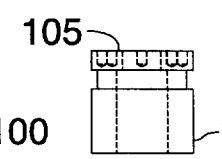
FIG. 5e   FIG. 5f   FIG. 5g   FIG. 5h
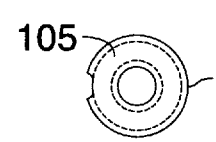 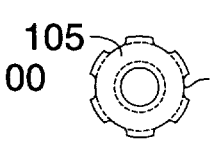 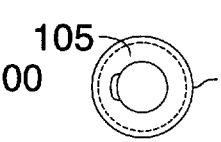 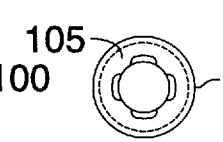
FIG. 5ii   FIG. 5jj   FIG. 5kk   FIG. 5ll
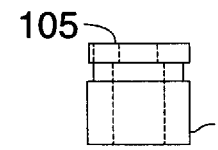 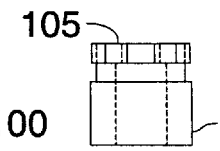 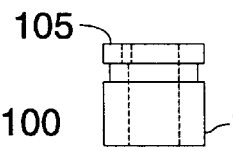 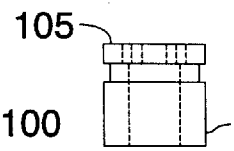
FIG. 5i   FIG. 5j   FIG. 5k   FIG. 5l

MULTI-PURPOSE MACHINE TOOL FOR HIGH VOLUME SECONDARY OPERATIONS

This application claims the benefit of U.S. Provisional Application No. 60/096,018, filed Aug. 11, 1998.

FIELD OF THE INVENTION

The present invention is a multi-purpose, computer controlled, machine tool for performing secondary operations on lathe turned metal parts. The machine tool of the present invention is designed for versitility and adaptability. Various combinations of machining heads and alternative configurations may be utilized to lower cost and increase efficiency for high volume machining operations.

BACKGROUND OF THE INVENTION

Machining holes, commonly called crossholes, through the wall of material between the outside diameter (O.D.) and inside diameter (I.D.) of a workpiece, perpendicular to the workpiece centerline, is a common machining operation. Crossholes are typically machined by one of three methods:

In the first method, suitable for relatively low volume production, the lathe or turning machine tool has the capability to stop, and perhaps index, a spindle holding the workpiece. The crosshole is machined using a special live tooling spindle which supports a cutter for machining the crosshole. Generally there is no provision for a guide bushing to support the cutter in the live tooling spindle. Most turning machine tools are not equipped to lock or index the main spindle.

A second method for machining crossholes requires that the turned workpieces be machined in a second machine tool such as a drill press or vertical milling machine. The workpiece is generally located with it's centerline horizontal in a fixture capable of indexing. A guide bushing may or may not be used and, depending on the capacity and capability of the machine tool, multiple fixtures and computer control may be used. This method usually does not lend itself well to automated loading and unloading of the workpiece and typically workpiece features are machined individually on one workpiece at a time. Safety concerns and the relative inefficiencies associated with manual loading make this method suitable only for low to medium volume production.

A third method of machining crossholes involves the use of a special purpose machine tool custom designed and built for a particular application. Typically a special purpose machine tool is dedicated to a single workpiece configuration; at most it might accommodate a limited family of parts. Using a special purpose machine tool, automatic workpiece loading and unloading capabilities may be incorporated, making this method suitable for high volume. production.

The principal drawback of a special purpose machine tool is that it is labor intensive and expensive to change to a different workpiece configuration. When the geometry of the workpiece changes or the workpiece becomes obsolete the custom built machine tool usually requires extensive redesign and reconfiguration or may itself become obsolete. Moreover, for machining workpieces with complex geometries, it may be impossible or impractical to create a single special purpose. machine tool. Several custom machine tools may be required, resulting in inefficiencies, inaccuracies, and additional costs associated with multiple part handlings and set-ups.

SUMMARY OF THE INVENTION

It is an object of the present invention to provide a single multi-purpose machine tool that provides the ability to machine many workpiece feature geometries at high volume production efficiencies.

It is another object of the present invention to provide a multi-purpose machine tool with the capability for set-up changes to be made quickly and easily by having a vertical machining head and indexer with integral workholder mounted on a slide assemblies.

It is yet another object of the present invention to provide a multi-purpose machine tool that has the capability to make dimensional adjustments by computer control.

It is yet another object of the present invention to provide a multi-purpose machine tool for which a combination of crosshole features, such as holes, slots and windows may be configured in a single set-up.

It is yet another object of the present invention to provide a multi-purpose machine tool capable of combining crosshole and end working features in a single set-up.

It is yet another object of the present invention to provide a multi-purpose machine tool in which various combinations of machining heads may or may not operate simultaneously.

It is yet another object of the present invention to provide a multi-purpose machine tool having a built-in workpiece loading and unloading capability with predictable cycle time and reliability.

It is a further object of the present invention to provide a multi-purpose machine tool having multiple axis motion capability.

According to the present invention, a multi-purpose machine tool having multiple horizontal machining heads and at least one vertical machining head slidably mounted on a gantry spanning the workpiece, and an indexer with integral workholder capable of two degrees of freedom is provided for performing high volume machining operations.

BRIEF DESCRIPTION OF THE DRAWINGS

FIG. 3-1 depicts a schematic side view of a large guide bushing pack assembly.

FIG. 3-2 depicts a schematic side view of a small guide bushing pack assembly.

FIG. 3-3 depicts a schematic top view of a large guide bushing pack assmebly.

FIG. 3-4 depicts a schematic top view of a small guide bushing pack assembly.

FIGS. 4, and 4*a*–4*l* shows a variety of workpiece samples that can be machined using the multi-purpose high volume machine tool of the present invention.

FIGS. 4*aa*–4*ll* show the end faces of the workpieces of FIGS. 4*a*–4*l* respectively.

FIGS. 5. and 5*a*–5*l* shows a variety of end working machining samples that can be made using the multi-purpose high volume machine tool of the present invention.

FIGS. 5*aa*–5*ll* show the end faces of the machining samples of FIGS. 5*a*–5*l*.

DETAILED DESCRIPTION OF THE PREFERRED EMBODIMENT

Figure 1:
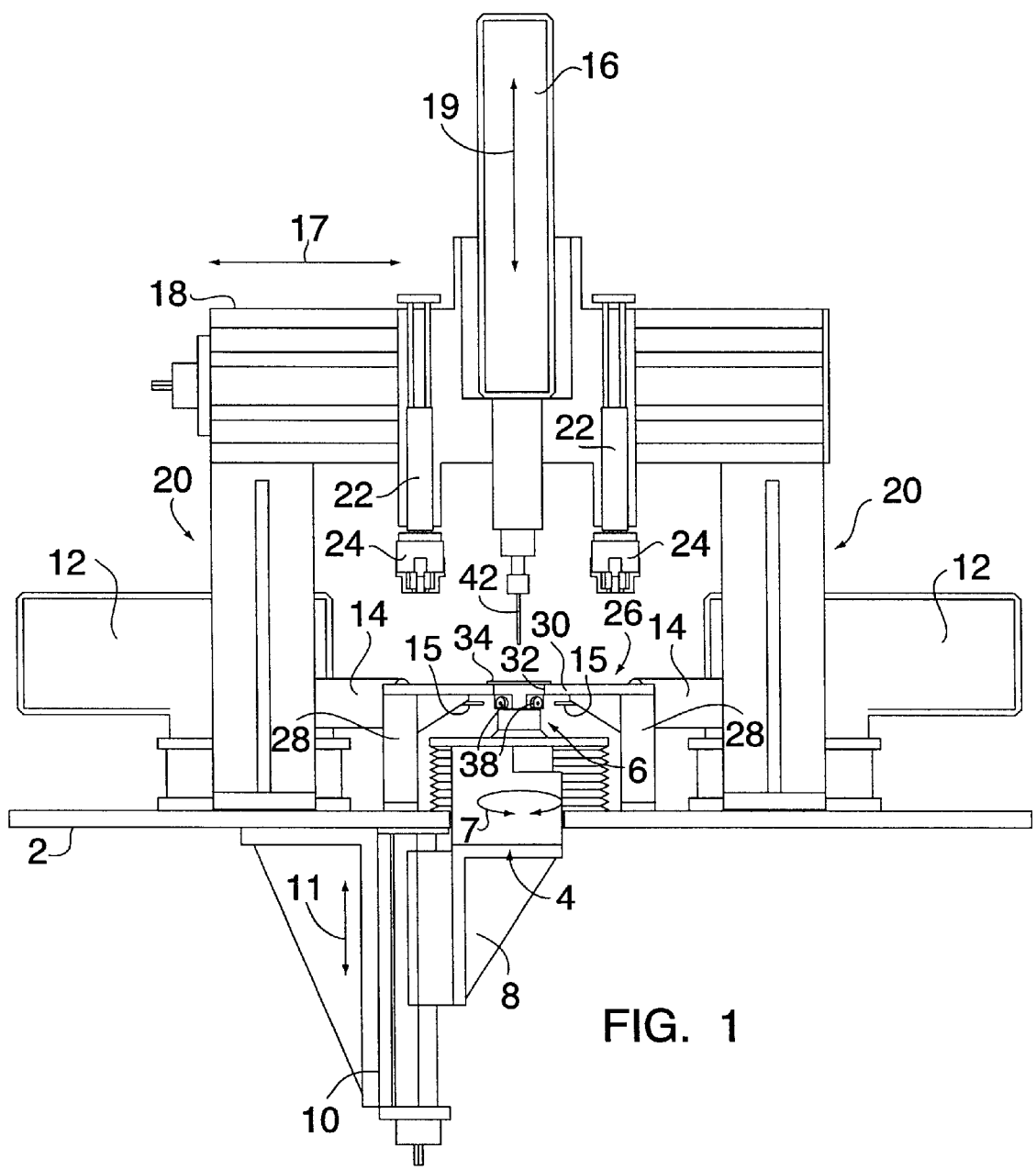
FIG. 1 depicts a schematic front view of a multi-purpose high volume machine tool of the present invention.

Referring to FIG. 1, the preferred embodiment of the present invention includes a machine base platform (2) which can be either a casting or weldment, having a centrally located indexer (4) with integral workholder(6). The indexer (4) is capable of simple indexing or moving at a controlled feedrate in C axis (7) by conventional means. The workpiece is clamped in a collet type workholder (6) with the workpiece centerline vertical (perpendicular to the machine base platform). The indexer (4) protrudes above the machine base platform (2) and is supported by a bracket (8) attached to an indexer slide (10). The indexer slide (10) is mounted to the underside of the machine base platform (2) and can move up and down vertically along the Z6 axis (11).

Figure 2:
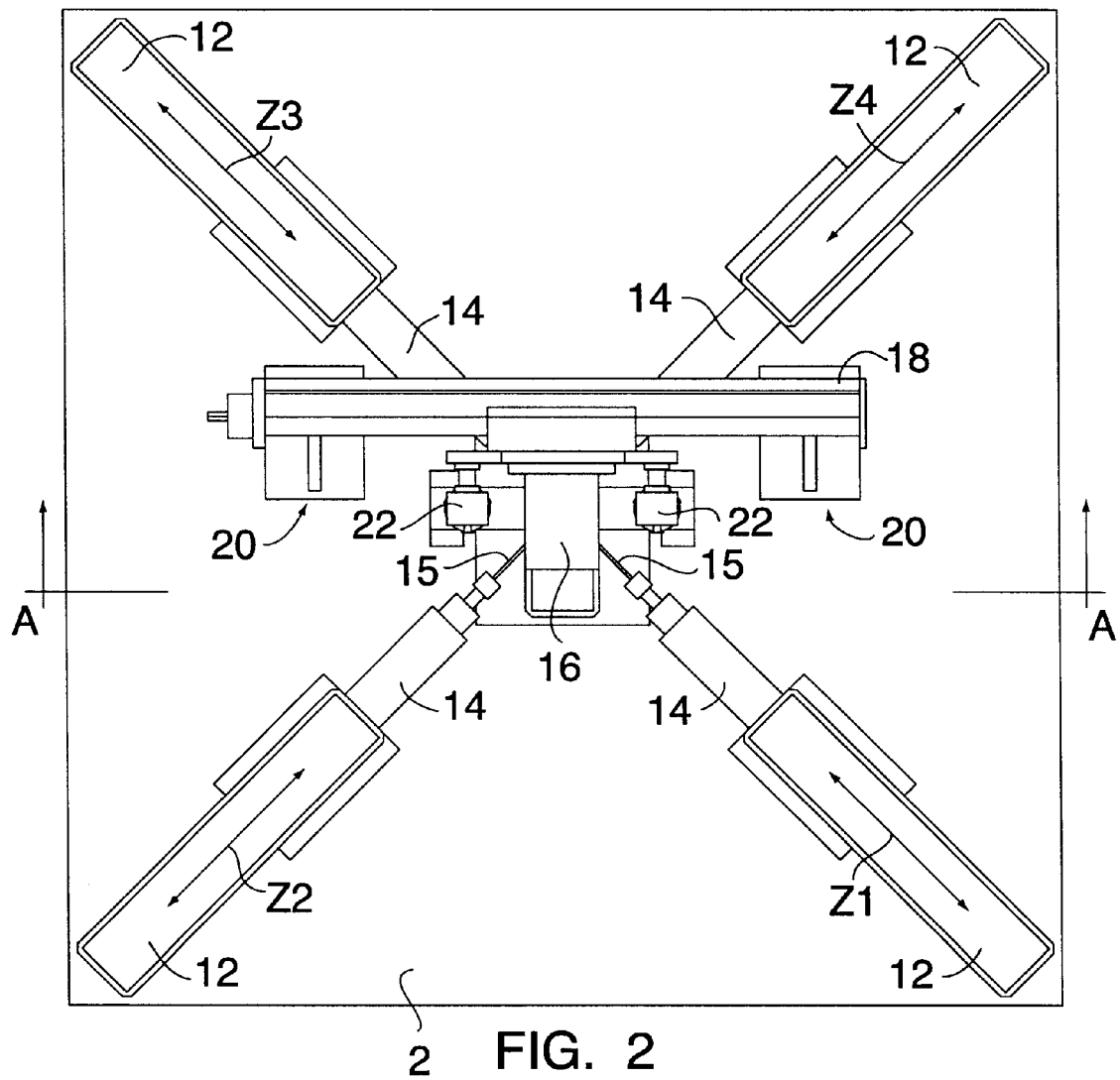
FIG. 2 depicts a side view of the multi-purpose high volume machine tool of FIG. 1.

Referring to FIG. 2, four horizontal machining heads (12) are rigidly attached to the machine base platform (2) and arranged equally spaced with their spindle (14) centerlines at an equal distance above the base platform (2) and oriented toward the workholder/workpiece centerline. The machining heads (12) advance and retract along centerlines, Z1, Z2, Z3, and Z4, perpendicular to the workpiece centerlines. Cutting tools (15) may be drills or endmills or other tools commonly used in the art. The machining heads (12) and workholder (6) have sufficient rigidity to sustain normal cutting forces. All machining heads (12) described herein are commercially available computer controlled motor driven or pneumatic or any other conventional machining head capable of rapid positioning or controlled feedrate motion.

Figures 1, 3:
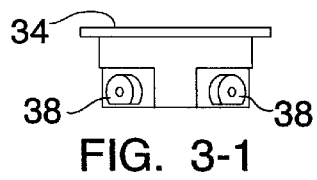
FIG. 3 depicts a detail schematic view of the guide bushing pack assembly.
Figures 2, 3:
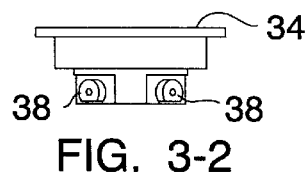
Figure 3:
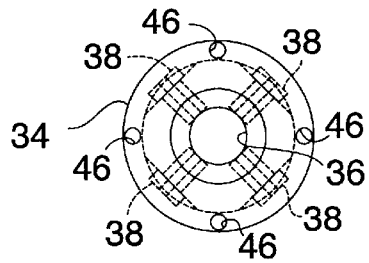

Referring again to FIG. 1, a vertical machining head (16) is rigidly attached to a gantry leadscrew slide (18) which moves horizontally along the X axis (17) and is supported by a gantry assembly (20). The vertical machining head (16) advances and retracts along a vertical axis, Z5, (19) which is in-line with the workholder (6) and workpiece centerline. As depicted in FIG. 3, a guide bushing (21) may be used to enhance vertical machining rigidity. The vertical machining head may be used for deburring the I.D. of the workpiece, or for creating end face features as will be more particularly described below.

Also rigidly attached to the gantry leadscrew slide (18) are one or more vertical motion slides (22) with end effectors (24) for automatic loading and unloading of workpieces, In order to minimize gantry leadscrew slide (18) travel and thus total cycle time, it is preferable for un-machined workpieces to be positioned such that the loader and unloader vertical motion slides (22) with end effectors (24) can perform the advance, grasp and retract motions simultaneously. Likewise, in the preferred embodiment, the finished workpiece is discharged at a point when the loader slide (22) is positioned above the workholder so that the loader and unloader slides (22) perform the advance, release, and retract motions simultaneously.

A bridge assembly (26) comprising two stanchions (28) fixedly attached to the machine base platform (2) and to a horizontal plate (30) supports the workholder (6). The horizontal plate (30) has a circular hole therethrough about the indexer (4) centerline, Z5 (19) for receiving the workholder (6).

Disposed within the hole and attached to the workholder (6) is an interchangeable guide bushing pack assembly (34) having a circular hole (36) about the vertical centerline Z5, (19) large enough to allow sufficient clearance around the workpiece. The guide bushing pack (34) has guide bushings (38) equally spaced about the guide bushing pack (34) and in line with the centerlines Z1, Z2, Z3, and Z4 of the horizontal machining heads. The dimensions of the bridge (26) and bushing pack assemblies (34) allow machining to be performed close to the workholder (6) when the indexer slide (10) is in the up position along the Z6 axis (11).

Figures 3, 4:
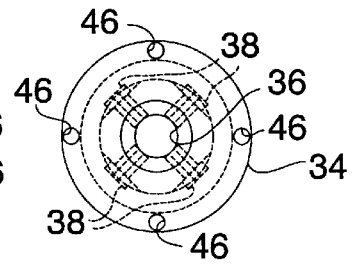
Figure 3:
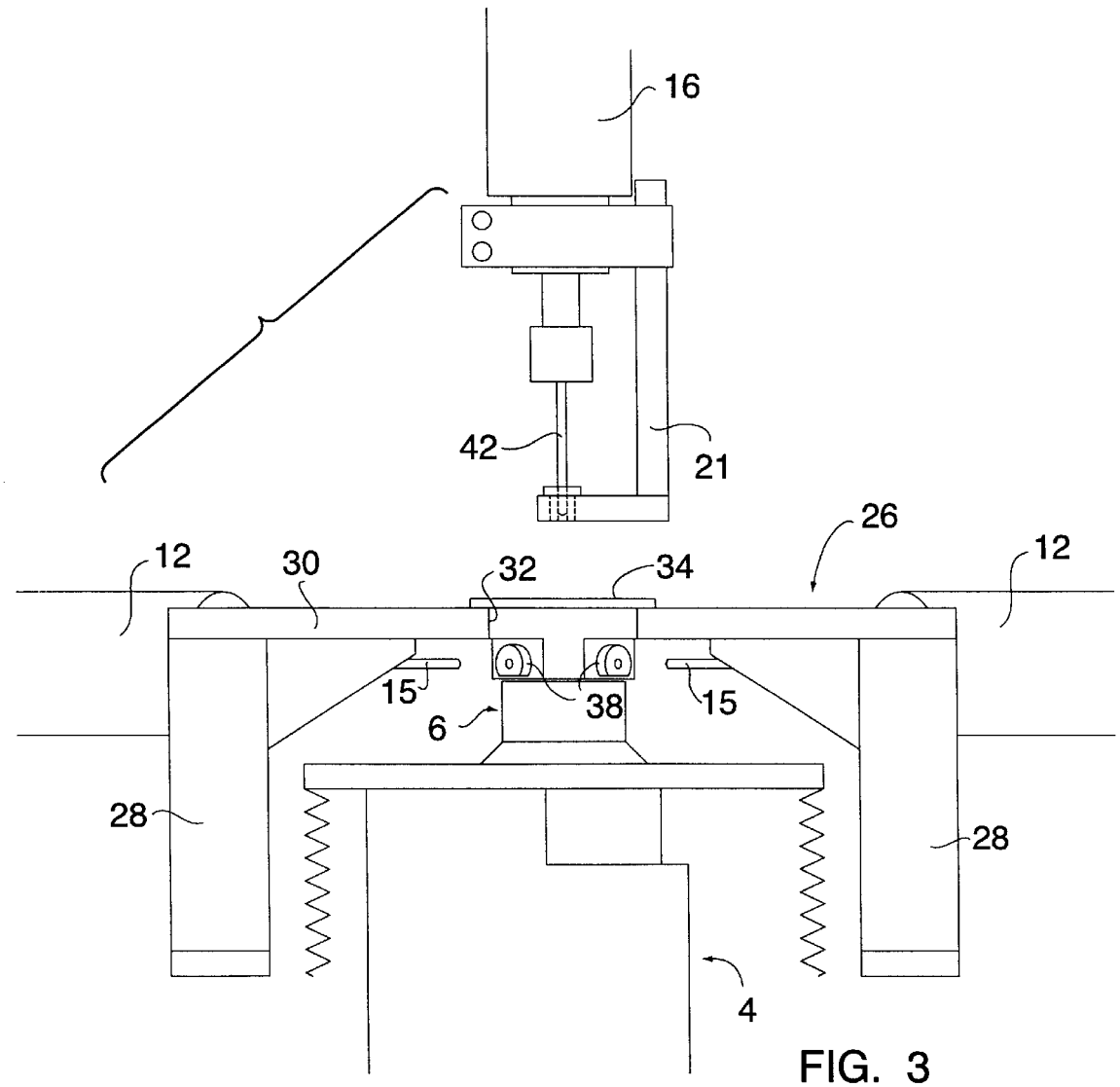

Referring to FIG. 3, the interchangeable guide bushing pack assembly (34) is depicted in detail. As shown, the vertical machining head (16) with cutting tool (42) is positioned above the workholder (6) with guide bushing pack assembly (35) installed. The guide bushing pack assembly (35) with guide bushings (38) is removeably attached to the workholder (6) through attachment points (46) (See FIGS. 3-3 and 3-4). Guide bushing pack assemblies (34) configured for comparatively large and small workpieces are depicted in FIGS. 3-1 and 3-2 (side views) and FIGS. 3-3 and 3-4 (top views) respectively.

It will be appreciated by those skilled in the art, that a key advantage of the present invention over custom built machine tools is the relative ease with which it can be reconfigured to a different workpiece set-up. Set-up involves the installation of specific-cutting tools, workpiece specific bushing pack, workpiece specific workholder, and, workpiece handling end effectors. To set-up the multi-purpose machine tool of the present invention, the vertical machining head (16) can be moved along the X axis for easy access to the horizontal machining heads, (12) the guide bushing pack assemblies, (34) and workholder area without loss of Z5 positioning. The guide bushing pack assembly (34) can be removed from the bridge (26) and serviced or replaced as a unit. With the guide bushing pack assembly (34) removed, the workholder (6) is accessible through the hole in the bridge and can be moved vertically along the Z6 axis for convenient access.

For simple operations, such as machining a crosshole (102) depicted in FIGS. 4a and 4aa (side and end face (105) views of workpiece (100) respectively), the sequence of operations for a single workpiece (100) begins with all machining heads retracted and the indexer positioned along the the Z6 axis at the correct height to properly locate the crossholes. The work holder is unclamped The gantry leadscrew slide moves along the X axis to position the loader slide and end effector above a workpiece (100) to be machined. The loader slide advances, the end effector grasps the workpiece (100) and then the slide retracts. The gantry leadscrew slide moves along the X axis to position the workpiece (100) above the workholder. The loader slide then advances placing the workpiece (100) in the workholder. The workholder clamps on the workpiece,(100) the end effector releases and the loader slide retracts. The gantry leadscrew slide moves along the X axis to position the vertical machining head above the workpiece (100) and the machining cycle begins. The horizontal machining heads advance their cutters along the Z1, 72, Z3, and Z4 axes through the guide bushings and workpiece,(100) and then retract. The vertical machining head advances it's cutter to a point beyond the crossholes (102) to remove burrs along the Z5 axis and then retracts. The Z axis motion sequences may be repeated to minimize burrs by double cycling. The machining cycle is then complete and the gantry leadscrew slide moves along the X axis to position the unloader slide and end effector above the finished workpiece,(100). The unloader slide advances, the end effector grasps the workpiece,(100) the workholder unclamps and the unloader slide retracts. The gantry leadscrew slide moves along the X axis to an appropriate position for the unloader to release the finished workpiece,(100) and all machining heads reposition to the start position, thus completing the cycle for a single workpiece.

The advantages of the present invention over a custom machine tool become apparent for more complex workpieces in which the X, Z6, and C axes are utilized. Referring to FIGS. 4b and 4bb, for example, in which equally spaced crossholes are required, the four horizontal machining heads advance and retract to produce four holes (102) and the workpiece (100) is then indexed about the C axis 90 degrees. The horizontal heads advance and retract again to produce the four remaining holes (102). In FIGS. 4c and 4cc, depicting a workpiece with five incline rows of eight equally spaced crossholes, (102) the first row of eight crossholes (102) is machined as in FIG. 4b, and then the workpiece is repositioned along the Z6 axis the requisite number of times for the machining of the other four rows of hole patterns. In FIGS. 4d and 4dd, in which staggered rows of equally spaced crossholes (102) are shown, the crossholes are machined in the same manner as in FIG. 4c except there would be a 45 degree C axis positioning move after each Z6 axis positioning move. It will be appreciated that there are numerous possible combinations of hole patterns that can be conveniently machined using the present invention, making the present multi-purpose machine tool far more versatile than a special purpose custom machine tool, where space and cost considerations make it impractical or impossible to mount a sufficient number of machining heads to achieve the same thing.

Crosshole features such as slots and, windows may also be machined using the present invention. Referring to FIGS. 4e and 4ee, for example, in which equally spaced vertical slots are shown, the four horizontal machining heads advance their cutters into the workpiece (100) and remain there while the workpiece is moved vertically at a controlled feedrate in the Z6 axis to achieve the desired slot length. The horizontal machining heads then retract. In FIGS. 4f and 4ff, eight equally spaced vertical slots are machined by indexing the workpiece (100) 90 degrees in the C axis after the first machining cycle. In FIGS. 4g and 4gg, two in-line rows of eight equally spaced vertical slots are machined. The first row is machined as in FIG. 4f, then the workpiece is repositioned in the Z6 axis for machining of the second row. Staggered rows of equally spaced vertical slots, as in FIGS. 4h and 4hh, may be machined by incorporating a a 45 degree C axis positioning move after each Z6 axis positioning move.

Horizontal slots may also be machined using the multi-purpose machine tool of the present invention. As depicted in FIGS. 4i and 4ii, for example, equally spaced horizontal slots are created when the four horizontal machining heads advance their cutters into the workpiece (100) and remain there while the workpiece is rotated at a controlled feedrate in the C axis to achieve the desired slot length. The horizontal machining heads then retract. FIGS. 4j and 4jj depict three rows of four equally spaced horizontal slots, machined as in FIG. 4i with the addition of the requisite number of vertical positioning moves in the Z6 axis after each slot pattern is machined.

Rectangular openings (commonly called windows) may also be made using the multi-purpose machine tool of the present invention. In FIGS. 4k and 4kk, for example, equally spaced windows are shown. To machine a window, the four horizontal machining heads advance their cutters into the workpiece (100) and remain there during the machining cycle. The workpiece rotates clockwise (CW) as seen in FIG. 2, in C axis to achieve the desired window width. The workpiece then moves down vertically in the Z6 axis to achieve the desired window length. The workpiece then rotates back counterclockwise (CCW), in the C axis as shown in FIG. 2, the same number of degrees it rotated CW. The workpiece is then moved up vertically in the Z6 axis to the original start point. The start and end points of a window machining operation are optional. At the end of the cycle, t he horizontal machining heads retract. All C axix and Z6 axis moves are at a controlled feedrate. As shown in FIGS. 4l and 4ll, in-line rows of four equally spaced windows may be machined as in FIG. 4k, with the addition of a vertical Z6 axis positioning move to machine the second row.

It is possible to perform rough and finish machining of slots and windows by decreasing the magnitude of axes motion for the rough pass and increasing it to finish size for the finish pass.

The versatility of the present invention is enhanced by vertical axis machining capabilities such as deburring or finish machining of the workpiece I.D. using either a single diameter cutting tool or a variety of step drills, counterbores or form tools moving, along the workpiece centerline Referring to FIGS. 5a and 5aa, for example, a slot across the end face (105) of the workpiece (100) is machined by moving the vertical machining head off center relative to the workpiece along the X axis. The vertical machining head cutter is positioned to the correct slot depth in the Z5 axis and remains there while it is moved across the workpiece (100) in the X axis at a controlled feedrate. The vertical machining head is then retracted.

Likewise, as shown in FIGS. 5b and 5bb, two perpendicular slots may be cut across the end face (105) of the workpiece (100) by indexing the workpiece in the C axis between slotting moves.

In FIGS. 5c and 5cc, a counterbore is machined by positioning the vertical machining head to the counterbore depth and feeding in the X axis to the desired diameter. The workpiece (100) is then rotated in the C axis 360 degrees and the vertical machining head retracted.

An annular groove in the face of the workpiece, as shown in FIGS. 5d and 5dd can be machined by positioning the vertical machining head off center relative to the workpiece (100) along the X axis to the desired diameter. The vertical machining head cutter is then advanced into the workpiece (100) to the desired groove depth along the Z5 axis and remains there while the workpiece is rotated 360 degrees in the C axis. The vertical machining head is then retracted. It is possible to rough and finish machine the examples shown in FIGS. 5c and 5d, by adjusting the magnitude of the X and Z axes moves.

Offset hole machining, to create a bolt pattern, or row of holes, or indexed row of holes, as depicted in FIGS. 5e, 5ee, 5f, 5ff, 5g, 5gg, 5h, and 5hh for example, can be machined by positioning the vertical machining head off center relative to the workpiece along the X axis. The vertical machining head advances and retracts along the Z5 axis to drill the holes.

Notches in the O.D. of the workpiece, as depicted in FIGS. 5i and 5ii, can be machined by positioning the vertical machining head off center relative to the workpiece along the X axis. The vertical machining head cutter is advanced along the Z5 axis to the desired depth. The cutter is moved into the workpiece at a controlled feedrate along the X axis to the desired diameter and the workpiece is rotated at a controlled feedrate in the C axis the desired number of degrees. The cutter is then moved away from the workpiece along the X axis and retracted along the Z5 axis.

Figure 6:
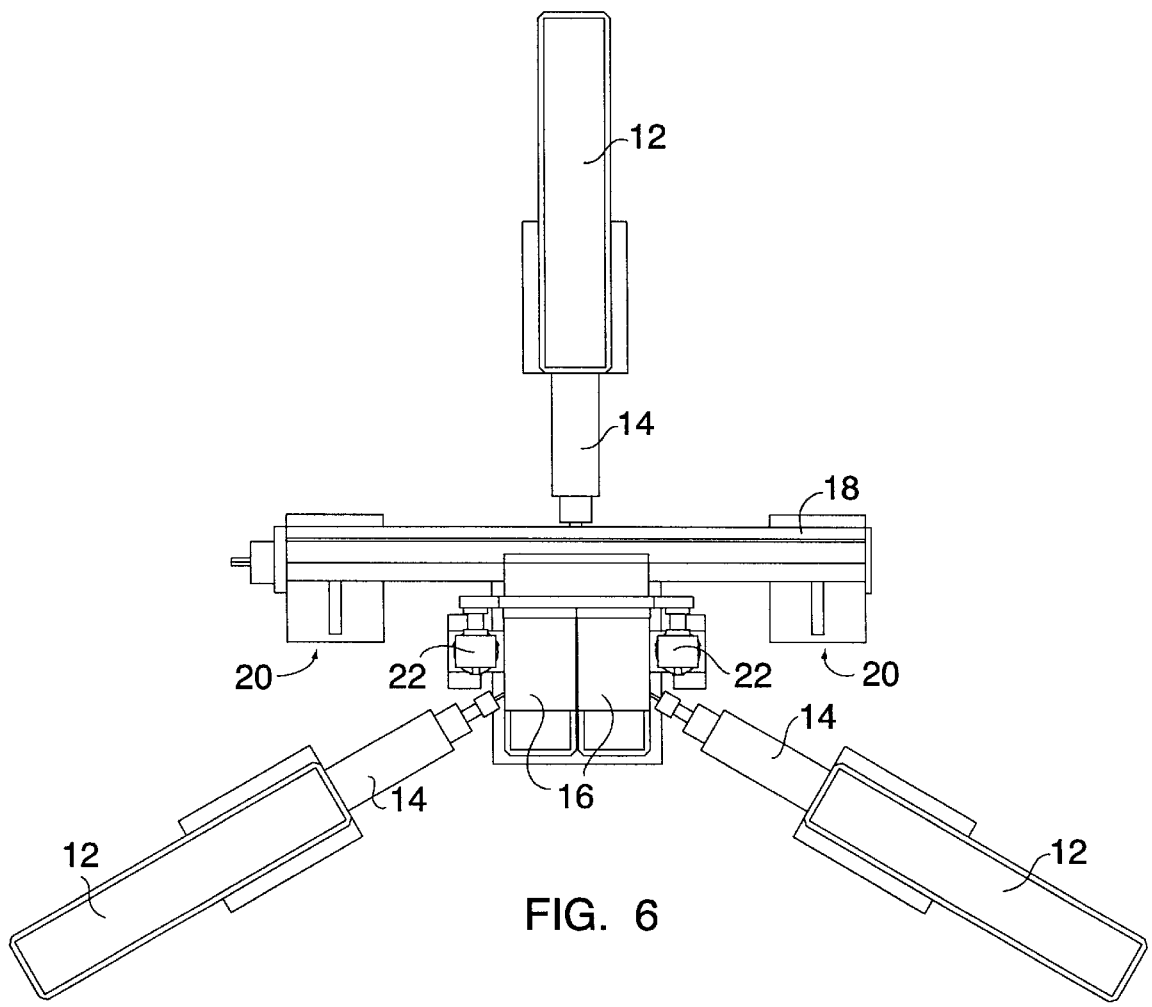
FIG. 6 depicts a plan view of an alternative embodiment having three horizontal machining heads and two vertical machining heads.
Figure 7:
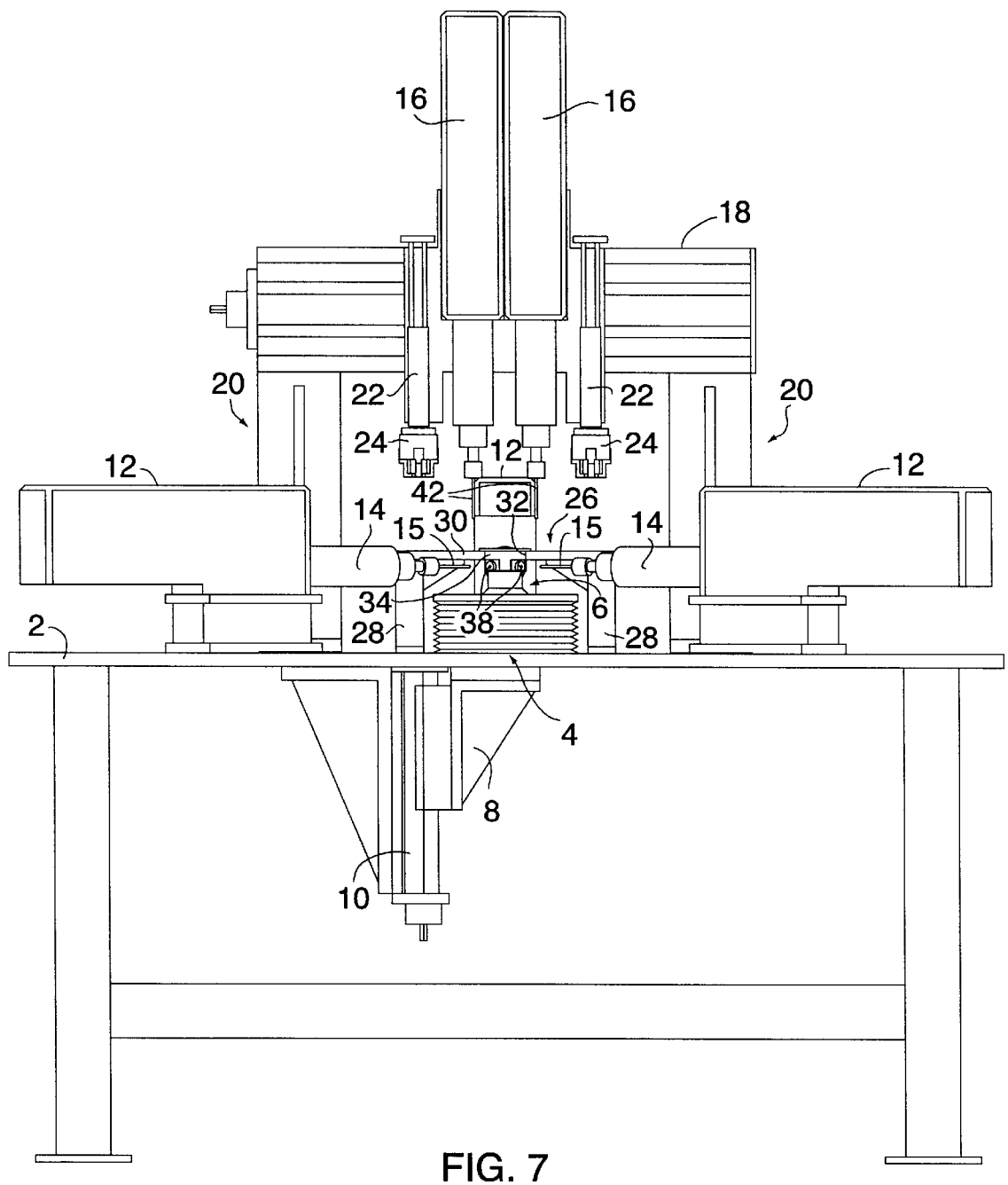
FIG. 7 depicts a front view of the embodiment of FIG. 6

Multiple external notches or scallops, internal notches and multiple internal notches are depicted in FIGS. 5j, 5jj, 5k, 5kk, 5l, 5ll respectively. They are machined as in FIG. 5i, with the addition of C axis indexing. It is possible to rough and finish machine these features by decreasing and increasing the magnitude of the X and C axes moves Combinations of features such as holes, slots and windows may be machined using a single set-up. Combinations of end face (105) features and crosshole (102) features are also possible in a single set-up. Machining heads may or may not operate simultaneously, and fewer than four horizontal heads may be used. One alternative embodiment employing three horizontal machining heads and two vertical machining heads is depicted in FIGS. 6 and 7. It is impractical to enumerate all the possible combinations of features here. Many other combinations and patterns will occur to those of ordinary skill in the art.

In yet another embodiment, a sequential tooling arrangement can be used, for example, drills may be in horizontal machining heads 1 and 3 and reamers, counterbores, or taps in heads 2 and 4 to progressively machine the workpiece using indexing. As another example, a centerdrill may be used in horizontal head 1, a drill in head 2, a counterbore in head 3, and a tap in head 4 to progressively machine with indexing.

In yet another embodiment, interpolation of the X and C axes can be done to allow contouring to create a whole new class of machining geometries for both workpiece side and end face machining.

While the present invention has been illustrated and described with respect to a particular embodiment thereof, it should be appreciated by those of ordinary skill in the art that various modifications to this invention may be made without departing from the spirit and scope of the invention.

I claim:

1. A multi-purpose machine for machining crossholes in a workpiece having a centerline, comprising:
    a machine base platform,
    an interchangeable workholder assembly for holding said workpiece mounted on an indexer on said machine base platform, said machine base platform having a horizontal plate spaced therefrom and connected thereto, said plate having an aperture therein for receiving said work holder and for receiving and supporting an interchangeable guide bushing pack assembly,
    a plurality of horizontal machining heads mounted on said machine base platform, each of said horizontal machining heads adapted for substantially simultaneous operation on the workpiece,
    wherein each of said horizontal machining heads has a centerline oriented toward the workpiece centerline,
    wherein the guide bushing pack assembly has a plurality of guide bushings, each guide bushing aligned with one of the horizontal machining heads,
    a gantry assembly mounted on said machine base platform, said gantry assembly arranged to span the workpiece,
    a vertical machining head slidably mounted on said gantry assembly, whereby the position of said vertical machining head is slidably adjustable relative to at least one of said horizontal machining heads along a horizontal axis parallel to said machine base platform.

2. A machine tool as in claim 1 further comprising a plurality of vertical machining heads.

3. A machine tool as in claim 1 wherein said vertical machining head further comprises a guide bushing attached thereto for enhancing vertical machining rigidity.

4. A machine tool as in claim 1, wherein the interchangeable guide bushing pack assembly is removably attached to said workholder assembly for enhancing horizontal machining rigidity.

5. A machine tool as in claim 1 wherein said workholder assembly includes a collet workholder.

6. A machine tool as in claim 1, and further comprising:
    means for automatic loading and unloading of the workpiece, whereby an unmachined workpiece is automatically loaded onto the workholder assembly for machining and the finished work-piece is automatically unloaded from the workholder assembly,
    wherein said means for automatic loading and unloading of a workpiece includes a pair of vertical motion slides, each slide of said pair having a first end mounted to said gantry assembly, and a distal end, on which an end effector is mounted for releasably grasping a workpiece, the pair comprising a loader side for loading an unmachined workpiece onto the workholder assembly and an unloader side for unloading a finished workpiece from the workholder assembly.

7. A machine tool as in claim 6 wherein said pair of vertical motion slides cooperate to grasp a workpiece, advance, release a workpiece and retract simultaneously.

8. A machine tool as in claim 1 wherein said gantry assembly includes a leadscrew slide.

9. A machine tool as in claim 1 wherein said workholder assembly is connected to a vertical slide for vertical positioning of the workpiece.

10. A machine tool as in claim 9 wherein said machine base platform defines a centrally located throughole for receiving said vertical slide.

11. A machine tool as in claim 1 wherein said horizontal and vertical machining heads are capable of substantially simultaneous operation on the workpiece.

12. A machine tool as in claim 1 wherein said plurality of horizontal machining heads comprise four machining heads spaced 90 degrees apart.

13. A machine tool as in claim 1 wherein said plurality of horizontal machining heads comprise three machining heads spaced 120 degrees apart.

14. A machine tool as in claim 1, wherein said machine tool is also adapted to machine slots in the workpiece.

15. A machine tool as in claim 1 wherein said machine tool is also adapted to machine windows in the workpiece.

* * * * *